United States Patent [19]
Seshadri

[11] Patent Number: 5,550,859
[45] Date of Patent: Aug. 27, 1996

[54] RECOVERING ANALOG AND DIGITAL SIGNALS FROM SUPERIMPOSED ANALOG AND DIGITAL SIGNALS USING LINEAR PREDICTION

[75] Inventor: Nambirajan Seshadri, Chatham, N.J.

[73] Assignee: Lucent Technologies Inc., Murray Hill, N.J.

[21] Appl. No.: 236,601

[22] Filed: Apr. 29, 1994

[51] Int. Cl.⁶ ............................ H04L 27/00; H04L 27/06
[52] U.S. Cl. ........................................... 375/216; 375/316
[58] Field of Search ........................ 375/5, 27, 25, 375/60, 59, 8, 216, 242, 222, 244, 316, 340, 295; 358/462; 348/409, 411, 14, 17, 385; 370/125; 379/93, 98

[56] References Cited

U.S. PATENT DOCUMENTS

| | | | |
|---|---|---|---|
| 5,231,494 | 7/1993 | Wachob | 348/385 |
| 5,287,200 | 2/1994 | Sullivan et al. | 348/411 |
| 5,347,305 | 9/1994 | Belch et al. | 348/14 |
| 5,440,585 | 8/1995 | Partridge III | 375/261 |

*Primary Examiner*—Tesfaldet Bocure
*Attorney, Agent, or Firm*—David R. Padness; Steven R. Bartholomew

[57] ABSTRACT

The recovery of each signal in a transmitted signal including a pair of superimposed signals is improved by the use of linear prediction. The pair of signals includes various combinations of analog and digital signals, e.g., an analog signal sample superimposed upon a digital signal sample, or a digital signal sample superimposed upon another digital signal sample. In a first embodiment, prediction coefficients for the analog signal are generated from the received signal. These coefficients are then used to recover the analog and digital signals from the received signal. In a second embodiment, the analog signal recovered, pursuant to the first embodiment, is considered a tentative estimate of the analog signal, and prediction coefficients for this tentative analog signal estimate are formed and used to generate final estimates of the analog and digital signal.

20 Claims, 6 Drawing Sheets

RECOVERING ANALOG AND DIGITAL SIGNALS FROM SUPERIMPOSED ANALOG AND DIGITAL SIGNALS USING LINEAR PREDICTION

TECHNICAL FIELD

The present invention relates to data communications and, more particularly, to a technique which utilizes predictive techniques for improving the recovery of digital and analog signals from a communication in which one such signal is superimposed upon the other.

BACKGROUND OF THE INVENTION

In an effort to increase the information carrying capacity of band-limited channels, techniques have been developed which permit analog, e.g., voice, and digital data signals to be simultaneously communicated in a single channel. One such arrangement to accomplish this, known as statistical multiplexing, uses the silence portions of an analog speech signal to transmit data. There are several shortcomings associated with statistical multiplexing. For one, silence detection can be a problem in environments, such as mobile communications systems, with significant background noise. For another, the quality of the analog speech signal may be degraded due to clipping at the beginning and end of this signal. For still another, both the data throughput and the delay experienced by the transmitted data are variable. Time division and frequency division multiplexing are other techniques which have been used to provide simultaneous voice and data communications capabilities for a single channel. With frequency-sharing, the division of the available bandwidth in many applications results in low data rates and/or lower speech quality. With time-sharing techniques, data rates of 9.6 to 19.2 kilobits/second have been transmitted along with digitized speech. By varying the voice/data allocations, a variety of results ranging from low-quality speech and high-data rates to high-quality speech and low-data rates are possible.

While implementation of time division multiplexing of voice and data signals can utilize standard speech coders and modems, the cost of implementation may exceed the desired cost objectives of certain applications.

More recently, in a patent application U.S. Ser. No. 08/076,505 entitled "Simultaneous Analog And Digital Communication", filed Jun. 14, 1993, issued as U.S. Pat. No. 5,448,555 on Sep. 5, 1996, assigned to the present assignee and incorporated herein by reference, a technique is disclosed wherein a voice signal is superimposed upon quadrature analog carrier signals whose amplitudes have been modulated with digital data. Further disclosed in this application is the use of linear prediction in both the transmitter and receiver to improve the recovery of the voice and data signals. The use of linear prediction in the transmitter requires that the prediction coefficients be transmitted to the receiver. Such coefficient transmission reduces the available bandwidth. While the bandwidth required for coefficient transmission can be reduced through the utilization of lower-order linear prediction schemes, such schemes reduce the voice and data signal recovery benefits obtainable for linear prediction. As a result, the user is faced with the quandary of either maximizing the data and voice recovery process and reducing the bandwidth usable for voice and data signal transmission or maximizing this bandwidth while reducing the accuracy of the voice and data signal recovery process. Since the transmission of a voice and data signal, one signal superimposed upon the other, will likely find widespread use, it would be desirable if a technique could be developed for such applications which would provide the signal recovery benefits of linear prediction but does not require the communication of prediction coefficients from the transmitter to the receiver.

SUMMARY OF THE INVENTION

Broadly speaking, the present invention relates to the use of linear prediction in the receiver to improve the recovery of each signal in a transmitted signal which includes a superimposition of a pair signals. This recovery is accomplished by receiving the transmitted signal and, in response thereto, generating prediction coefficients for one signal in the pair of signals. These coefficients are then used to recover each signal in the pair of signals. Advantageously, the present invention is applicable to various types of superimposed signals and the does not require the use of linear prediction in the transmitter.

In the disclosed embodiments, the transmitted signal includes an analog signal superimposed upon a digital signal. In accordance with a first embodiment of the present invention, prediction coefficients for the analog signal are generated from the received signal. These coefficients are then used to recover the analog and digital signals from the received signal. In a second disclosed embodiment of the present invention, the analog signal recovered, pursuant to the first embodiment, is considered a tentative estimate of the analog signal, and prediction coefficients for this tentative analog signal estimate are formed and used to generate final estimates of the analog and digital signal. In still other disclosed embodiments, prediction coefficients are transmitted to the receiver and the analog signal superimposed upon the digital signal is a residual analog signal. In these other embodiments, prediction coefficients for the residual analog signal are generated from the received signal without regard to the transmitted prediction coefficients. These prediction coefficients are then used to recover the digital signal and the residual analog signal. The residual analog signal is then processed using the transmitted prediction coefficients to recover the analog signal.

Several techniques for generating the prediction coefficients for the analog signal are disclosed. Such techniques include processing the received signal as a pure analog signal, determining the autocorrelation coefficients of the received signal and using these coefficients to generate the prediction coefficients for the analog signal, and determining the autocorrelation coefficients of the analog signal and using these autocorrelation coefficients to generate the prediction coefficients for the analog signal.

DETAILED DESCRIPTION

Figure 1:
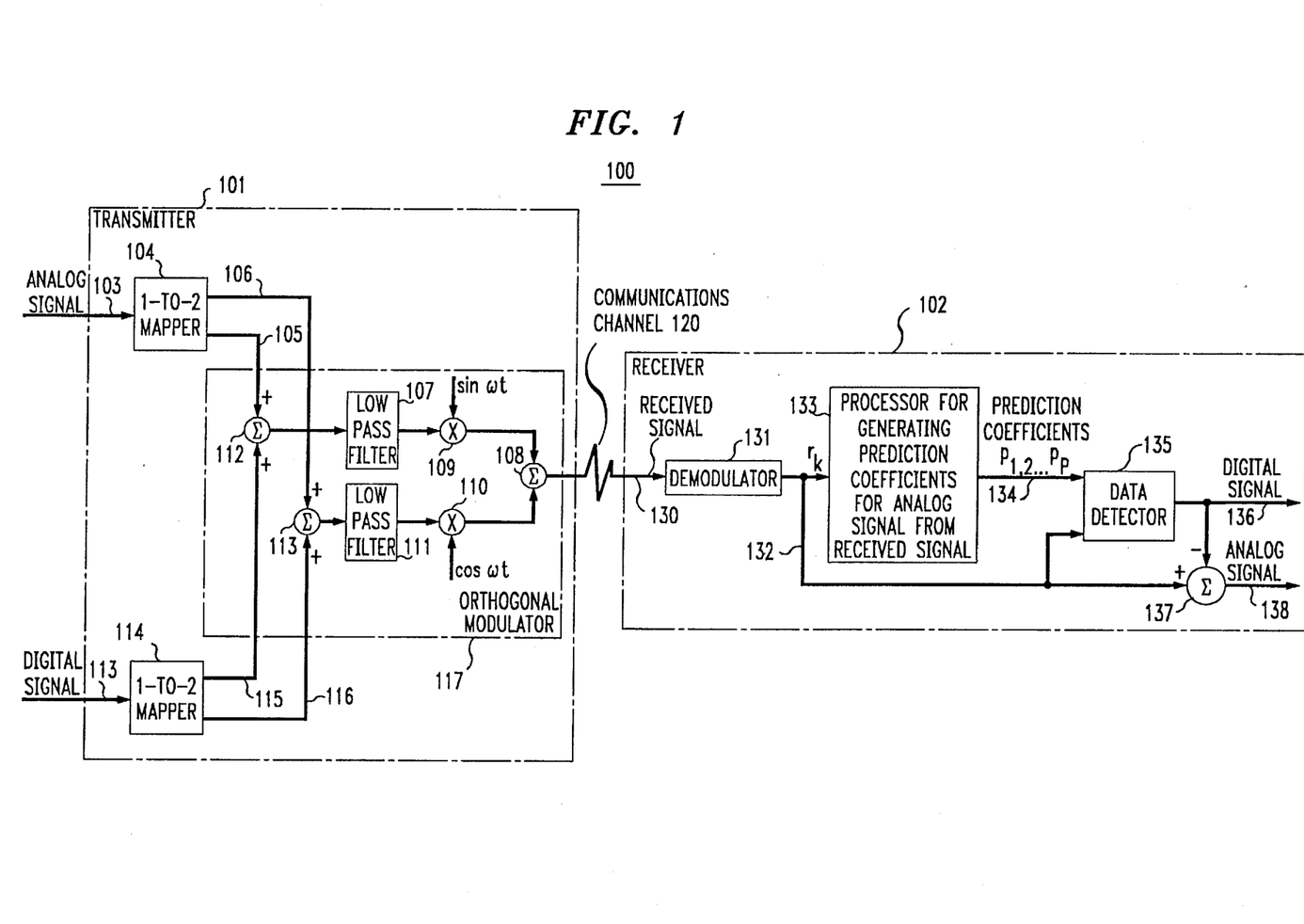
FIG. 1 is a block-schematic diagram of a first embodiment of the present invention wherein linear prediction is only utilized in the receiver.

In the illustrative communications system 100 shown in FIG. 1, analog and digital signals are simultaneously transmitted by superimposing the analog signal onto the digital signal. In this and the other embodiments to be described, the analog signal is a voice signal and the digital signal is a binary signal which is representative of data. Also in this and the other embodiments to be described, the values of the analog signal are independent of the values of the digital signal. Or, viewed another way, within the receiver, prediction coefficients are generated from the received signal regardless of whether or not this signal includes prediction coefficients. It should also, of course, be understood that other types of analog and digital signals can be utilized. As shown, the digital signal samples on lead 113 is mapped by the 1-to-2 mapper 114 into the so-called inphase and quadrature component signals on leads 115 and 116. Similarly, the analog signal samples on lead 103 is also converted into inphase and quadrature component signals on leads 105 and 106 using the 1-to-2 mapper 104. Adder 112 sums the inphase component signals while adder 117 sums the quadrature component signals. The outputs of these adders are then filtered by low-pass filters 111 and 107. Each of these filtered outputs modulate the amplitude of a different one of a pair of quadrature-related carrier signals using multipliers 109 and 110. Summer 108 then sums these modulated carrier signals prior to transmission through communications channel 120. At the receiver, the received signal 130 is coherently demodulated using the demodulator 131. The demodulated received signal, including analog and digital components, is used by processor 133 to extract the prediction coefficients of the analog signal from the received signal. Methods to extract these prediction coefficients will be explained later. The demodulated received signal on lead 132 and the prediction coefficients on lead 134 are used by the data detector 135 to detect the digital signal samples. Following detection, adder 137 subtracts the digital signal on lead 136 from the received signal on lead 132 to produce the analog signal samples on lead 138.

At the outset, it should be recognized that if one can form estimates of the prediction coefficients, the analog and digital signals can be recovered. In particular, assuming that the magnitude of the noise in the communications channel is very much smaller than the magnitude of the received signal (which is typically the case), then the received signal $r_k$ appearing on lead 132 at sampling instant k is given by $$r_k = d_k + s_k \tag{1}$$

In equation (1), $d_k$ is the transmitted digital signal sample and $s_k$ is the transmitted analog signal sample at the $k^{th}$ sampling instant. An estimate $\hat{s}_k$ of the analog signal sample can be expressed as a linear combination of the past P analog signal samples. This estimate is given by $$\hat{s}_k = \sum_{i=1}^{P} p_i s_{k-i} \tag{2}$$

where each $p_i$ is a prediction coefficient for a different analog signal sample. The term P is a predetermined integer which is commonly referred to as the prediction order. In general, the greater the P, the more accurate the prediction. The estimation error, $e_k$, at any sampling instant can be expressed as $$e_k = s_k - \hat{s}_k \tag{3}$$

Using equation (1), equation (2) can be rewritten as $$\hat{s}_k = \sum_{i=1}^{P} p_i [r_{k-i} - d_{k-i}] \tag{4}$$

Subtracting this quantity from the received signal yields an estimate of the digital signal sample at the $k^{th}$ sampling instant, $\hat{d}_k$, where $$\hat{d}_k = r_k - \sum_{i=1}^{P} p_i [r_{k-i} - d_{k-i}] \tag{5}$$

Figure 5:
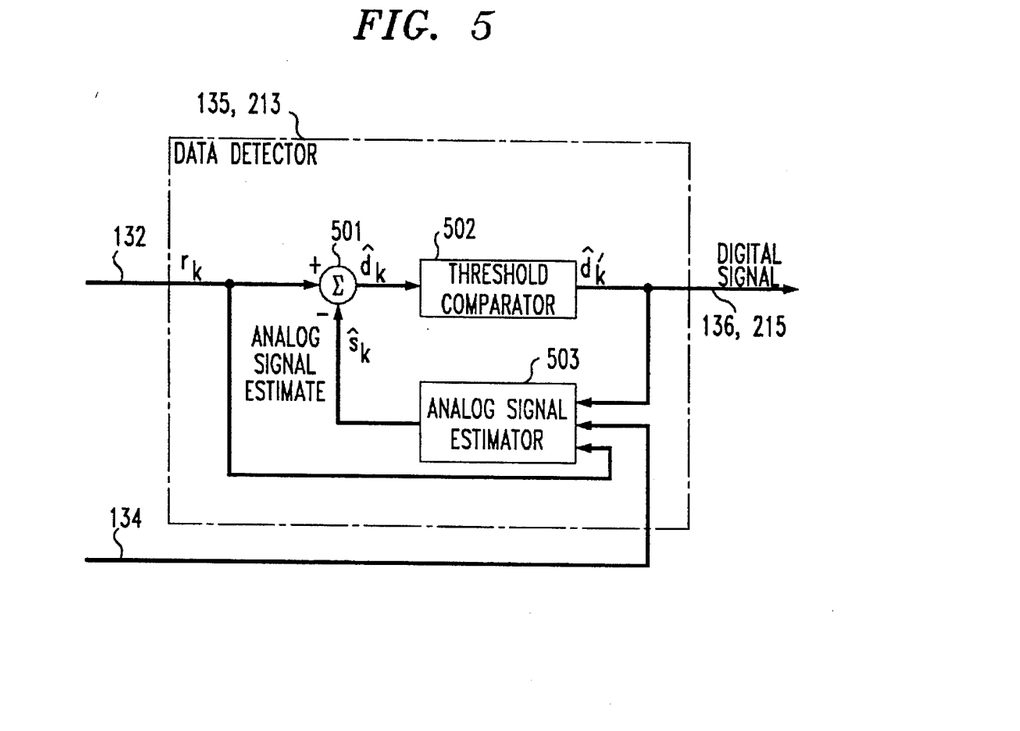
FIG. 5 is a block-schematic diagram of the one embodiment of a data detector 135 and 213 in FIGS. 1–4.

FIG. 5 shows a block-schematic diagram of illustrative circuitry which carries out equation (5) within the data detector 135 shown in FIG. 1. Within the data detector, analog signal sample estimator 503 forms an estimate of the current analog signal sample, $\hat{s}_k$, using the prediction coefficients on lead 134, the past received signal samples, $r_k$, and the past quantized digital signal sample estimates $\hat{d}'_k$, where $$\hat{s}_k = \sum_{i=1}^{P} p_i [r_{k-i} - \hat{d}'_{k-i}] \tag{6}$$

This estimate is subtracted from the current received signal sample appearing in lead 132 by summer 501 to form an estimate of the digital signal sample at the $k^{th}$ sampling instant. This latter estimate is designated as $\hat{d}_k$, where $$\hat{d}_k = r_k - \hat{s}_k \tag{7}$$

The estimate, $\hat{d}_k$, is quantized to the closest one of all the possible transmitted digital signal levels by threshold comparator 502 to form the quantized estimate of the digital signal at the $k^{th}$ sampling time. This estimate is designated as $\hat{d}'_k$. The structure of data detector 135 in FIG. 1 is also utilized within data detector 213. This latter detector is incorporated within the embodiments of the present invention shown in FIGS. 2 and 4 and which will be fully described herein below.

With perfect prediction and in the absence of noise, $\hat{s}_k = s_k$ and $\hat{d}_k = d_k$. However, in all practical applications, noise is present and there will be some degree of inaccuracy in the estimate of the analog and digital signal at the $k^{th}$ sampling instant. Furthermore, the prediction process for each sample is a function of the past P samples, where P is the prediction order. Consequently, the use of equation (5) is suboptimal in that an estimate of the digital signal at each sampling instant is determined without regard to prior and future estimates. A better process is to compute estimates of the digital signal a block at a time, where each block includes N successive digital signal samples, each estimate corresponding to a different one of N consecutive sampling times. N is a predetermined integer greater than P. In any digital communication system, a number of different blocks of size N are possible. For example, in a binary system, there are $2^N$ different blocks of size N. Using a predetermined criterion, we will examine each of the possible blocks of size N and choose one of these blocks. The N consecutive digital signals in this chosen block are deemed the best estimates of the digital signal. In this disclosed embodiment of the present invention, we will utilize the least squares criterion, compute an error term in accordance with this criterion, and choose the block having the smallest error term. Accordingly, the optimal estimates of N consecutive digital signals is the sequence $\{d_k\}_{k=1}^{N}$ having the smallest error term wherein the error term for any sequence is designated by $e_{\{d_k\}_{k=1}^N}$ and wherein $$e_{\{d_k\}_{k=1}^N} = \sum_{k=1}^{N}\left[\left[r_k - \sum_{i=1}^{P} p_i[r_{k-i} - d_{k-i}]\right] - d_k\right]^2 \quad (8)$$

Figure 6:
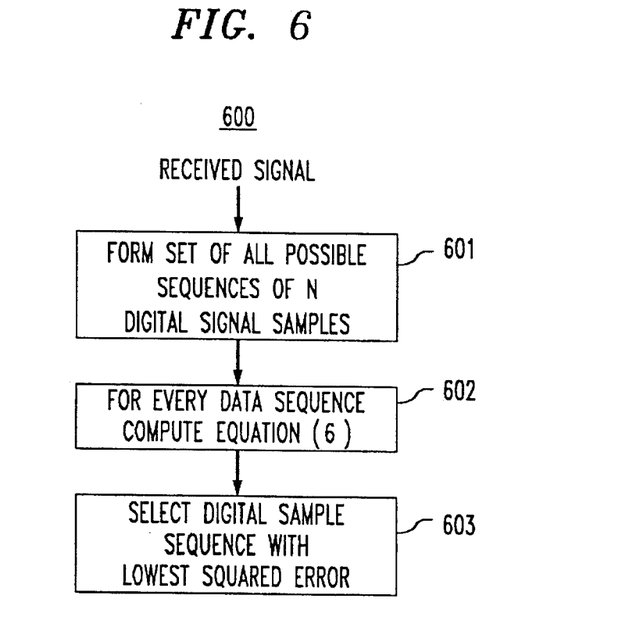
FIG. 6 is a sequence of operations carried out by another embodiment of data detector 135 and 213 in FIGS. 1–4.

Refer now to FIG. 6 which shows the sequence of operations 600 carried out to form the optimal N consecutive digital signal sample estimates using the least squares criterion. At step 601, the set of all possible transmitted digital signal sample sequences for N consecutive samples is formed. For each sequence in the set, at step 602, the squared error given by equation (6) is computed. At step 603, the digital signal sample sequence with the lowest squared error is selected. This exhaustive computational procedure can be implemented efficiently with the Viterbi algorithm using well-known techniques. See, for example, a publication entitled, "Maximum-Likelihood Sequence Estimation of Digital Sequences In The Presence of Intersymbol Interference", IEEE Trans. on Information Theory, Vol. IT-18, pp.363–378, May 1972. Or, any of the numerous and well-known variants of the Viterbi algorithm can be utilized. In either case, the operational sequence 600 can be readily implemented within data detector 135 and 213 using a microprocessor.

Up to this point, it has been assumed that the prediction coefficients for the analog signal can somehow be extracted from the received signal and that, given these coefficients, the discussion has focused on how the analog and digital signals can be recovered from the received signal. We now direct the focus of this discussion to techniques for generating the prediction coefficients for the analog signal. In the absence of the digital signal, the received signal is the analog signal itself. Estimating the prediction coefficients from an analog signal, such as speech, is well known. Here, we seek to find the coefficients $[p_1, \ldots, p_P]$ that minimize $$E[s_k - \sum p_i^s{}_{k-i}]^2 \quad (9)$$

where E denotes the expectation operator. Expanding and solving for the prediction coefficients results in $$\begin{bmatrix} R_{0,s} R_{1,s} \ldots R_{P-1,s} \\ R_{1,s} . R_{0,s} \ldots \\ R_{P-1,s} \ldots R_{0,s} \end{bmatrix} \begin{bmatrix} p_1 \\ . \\ p_P \end{bmatrix} = \begin{bmatrix} R_{1,s} \\ R_{2,s} \\ R_{P,s} \end{bmatrix} \quad (10)$$

Here $R_{j,s}$ is the $j^{th}$ autocorrelation coefficient of a received analog signal "s". As is well-known, the autocorrelation coefficient reflects the value of a signal, here, the analog signal, at a first time relative to a second time widely separated from the first. Since the values of this signal at the two widely-spaced times vary with time, an averaging process is used. The autocorrelation coefficient of the received analog signal can be expressed as $$R_{j,s} = \frac{1}{N}\left[\sum_{j=1}^{N} s_j s_{j+k}\right] \quad (11)$$

In the presence of digital signal, equation (11) is modified as follows. In accordance with one alternative technique, the presence of the digital signal is disregarded, and we assume that the received signal is solely an analog signal. The autocorrelation coefficients of the received signal, $R_{j,r}$, are obtained by replacing $s_j$ and $s_{j+k}$ in equation (11) with $r_j$ and $r_{j+k}$ to transform this equation to $$R_{j,r} = \frac{1}{N}\left[\sum_{j=1}^{N} r_j r_{j+k}\right] \quad (11)$$

Figure 7:
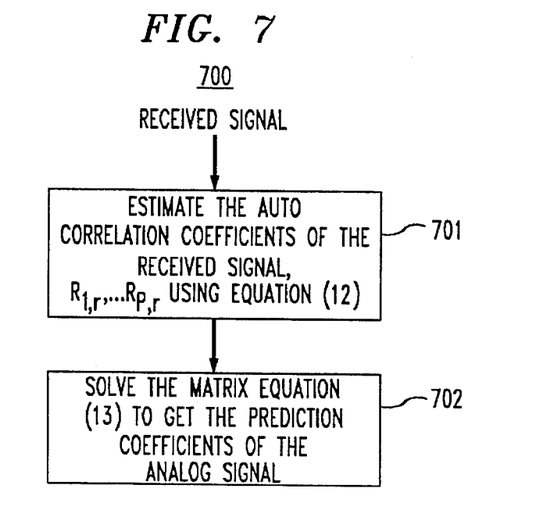
FIG. 7 is one sequence of operations which may be utilized by prediction recovery circuit 133 and 212 in FIGS. 1–4.

FIG. 7 illustrates a sequence of operations 700 carried out in processor 133 of FIG. 1 to generate the prediction coefficients. As shown in FIG. 7, at step 701, we compute the set of autocorrelation coefficients for the received signal, $R_{0,r}, \ldots, R_{P,r}$, using equation (12). Using these autocorrelation coefficients, the prediction coefficients can be determined by solving a matrix equation derived from matrix equation (10) by substituting the received signal, "r", for the analog signal "s". This derived matrix equation is $$\begin{bmatrix} R_{0,r} R_{1,r} \ldots R_{P-1,r} \\ R_{1,r} . R_{0,r} \ldots \\ R_{P-1,r} \ldots R_{0,r} \end{bmatrix} \begin{bmatrix} p_1 \\ . \\ p_P \end{bmatrix} = \begin{bmatrix} R_{1,r} \\ R_{2,r} \\ R_{P,r} \end{bmatrix} \quad (13)$$

This technique works well when the power of the digital signal is an order of magnitude or greater than the power of the analog signal. Unfortunately, the autocorrelation coefficients become increasingly biased when the power of the digital signal starts increasing, and we have observed that the performance degrades. An alternative technique for generating the prediction coefficients alleviates this performance degradation by removing the bias. Bias removal is accomplished by subtracting the autocorrelation coefficients of the digital signal from the autocorrelation coefficients of the received signal to estimate the autocorrelation coefficients of the analog signal. Assuming that the digital signal is random, which is typically the case, estimating the autocorrelation coefficients of the digital signal only needs to be done once. The autocorrelation coefficients of the digital signal are generally a function of the channel coding and modulation format. These coefficients can be determined in advance for a particular application and the coefficient values stored for later use. The autocorrelation coefficients of the digital signal, $R_{j,d}$, can be expressed as $$R_{j,d} = \frac{1}{N}\left[\sum_{j=1}^{N} d_j d_{j+k}\right] \quad (14)$$

Figure 8:
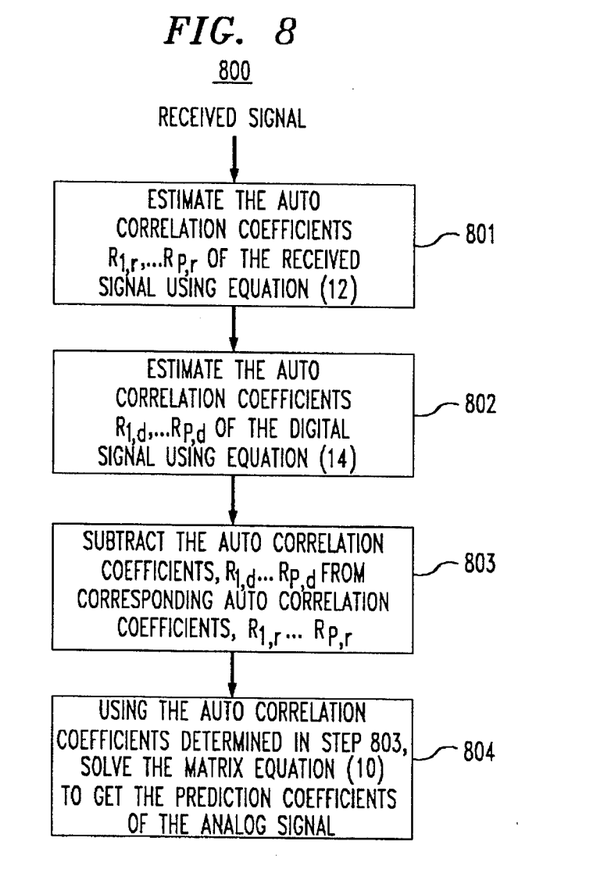
FIG. 8 is another sequence of operations which may be used by processor 133 and 212 in FIGS. 1–4.

FIG. 8 shows the sequence 800 of steps performed within processor 133 in this alternative method of generating the prediction coefficients. We first estimate the autocorrelation coefficients of the received signal at step 801 using equation (12). Next, at step 802, the autocorrelation coefficients of the digital signal are determined by using equation (14). This operation may be done in advance. At step 803, the coefficients determined at step 802 are subtracted from the autocorrelation coefficients determined in step 801 to form the autocorrelation coefficients of the analog signal. At step 804, we use the autocorrelation coefficients of the speech signal in equation (10) to determine the prediction coefficients for the speech signal. We have found that this method works best for low prediction order, i.e., a prediction order of 1–2. However, performance is not as good for a higher prediction order.

Figure 2:
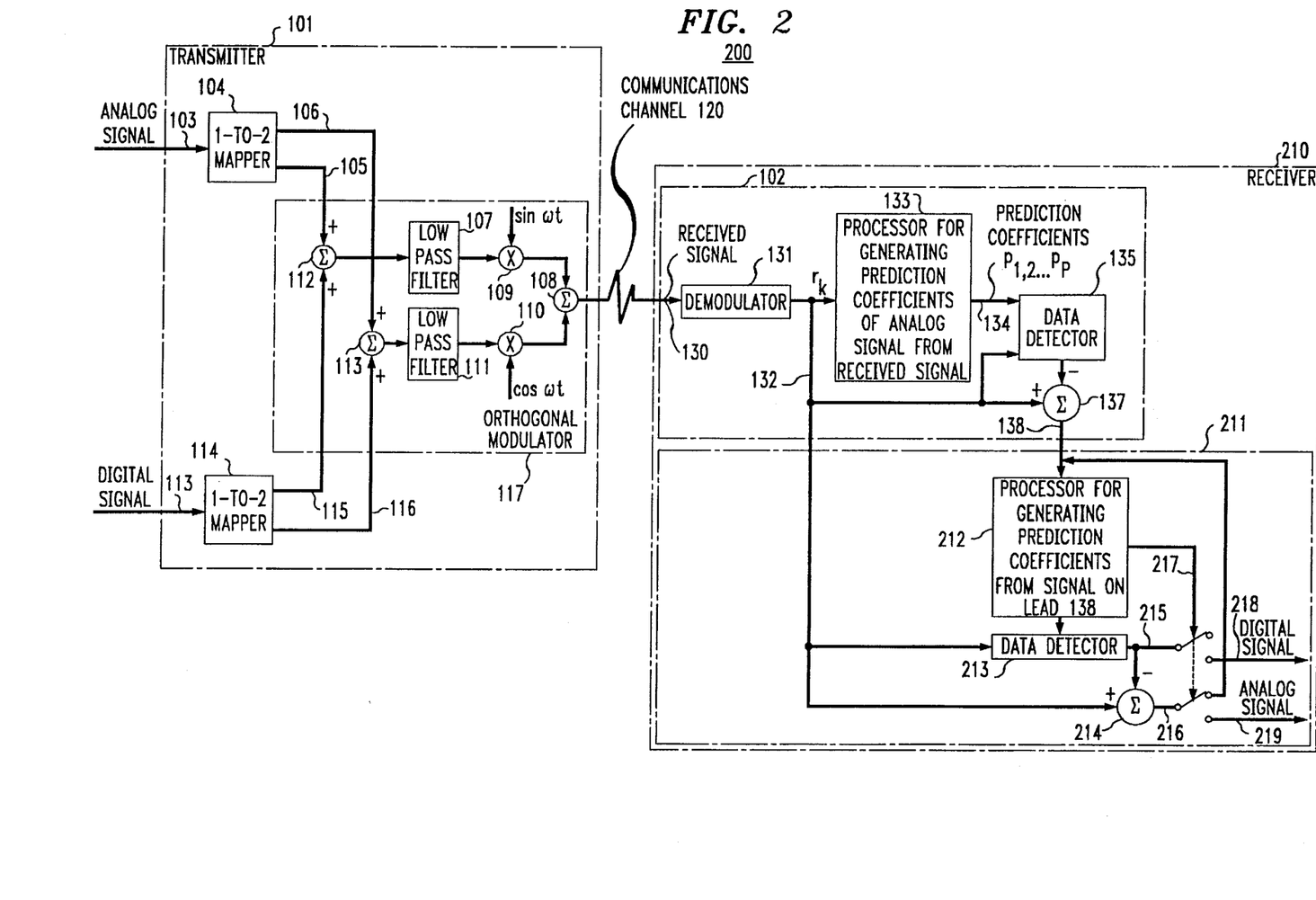
FIG. 2 is a block-schematic diagram of a second embodiment of the present invention wherein linear prediction is again only utilized in the receiver.

In order to solve the above-mentioned performance limitation for a higher prediction order, the embodiment 200 shown in FIG. 2 is proposed. The transmitter portion of embodiment 200 is identical to its counterpart in FIG. 1. The receiver structure 210 incorporates the receiver structure 102 of FIG. 1 and, in addition, utilizes a module 211 to incorporate an iterative technique. Receiver 210 forms a tentative estimate of the prediction coefficients from the received signal using any of a number of well-known techniques, including either of the two alternative methods discussed above and shown in FIGS. 7 and 8. Referring to FIG. 2, this function is provided by processor 133. The prediction coefficients appear in lead 134 and are used by data detector 135 to form tentative estimates of the digital signal. Each tentative digital signal estimate is then subtracted from the demodulated received signal on lead 132 by summer 137 to form a tentative estimate of the analog signal on lead 138. The prediction coefficients for the analog signal are now determined by processor 212 by treating the tentative estimate of the analog signal as a "clean" or pure speech signal. Processor 212 carries out the sequence of operations shown in FIG. 7 to estimate the new prediction coefficients. These new prediction coefficients are used by data detector 213 to obtain the digital signal on lead 215. Adder 214, by subtracting the digital signal on lead 215 from the received signal on lead 132, forms an estimate of the analog signal on lead 216. While the analog and digital signal estimates on leads 214 and 215, respectively, can be outputted, we have found that repeating this process about 2–3 times further results in improved performance. We have noticed very little performance improvement beyond 2–3 iterations. FIG. 2 reflects this iterative process by coupling the analog and digital signal estimates back to processor 212. After the desired number of iterations, a control signal on lead 217 is provided which respectively couples the estimates on leads 214 and 215 to leads 219 and 218.

Figure 3:
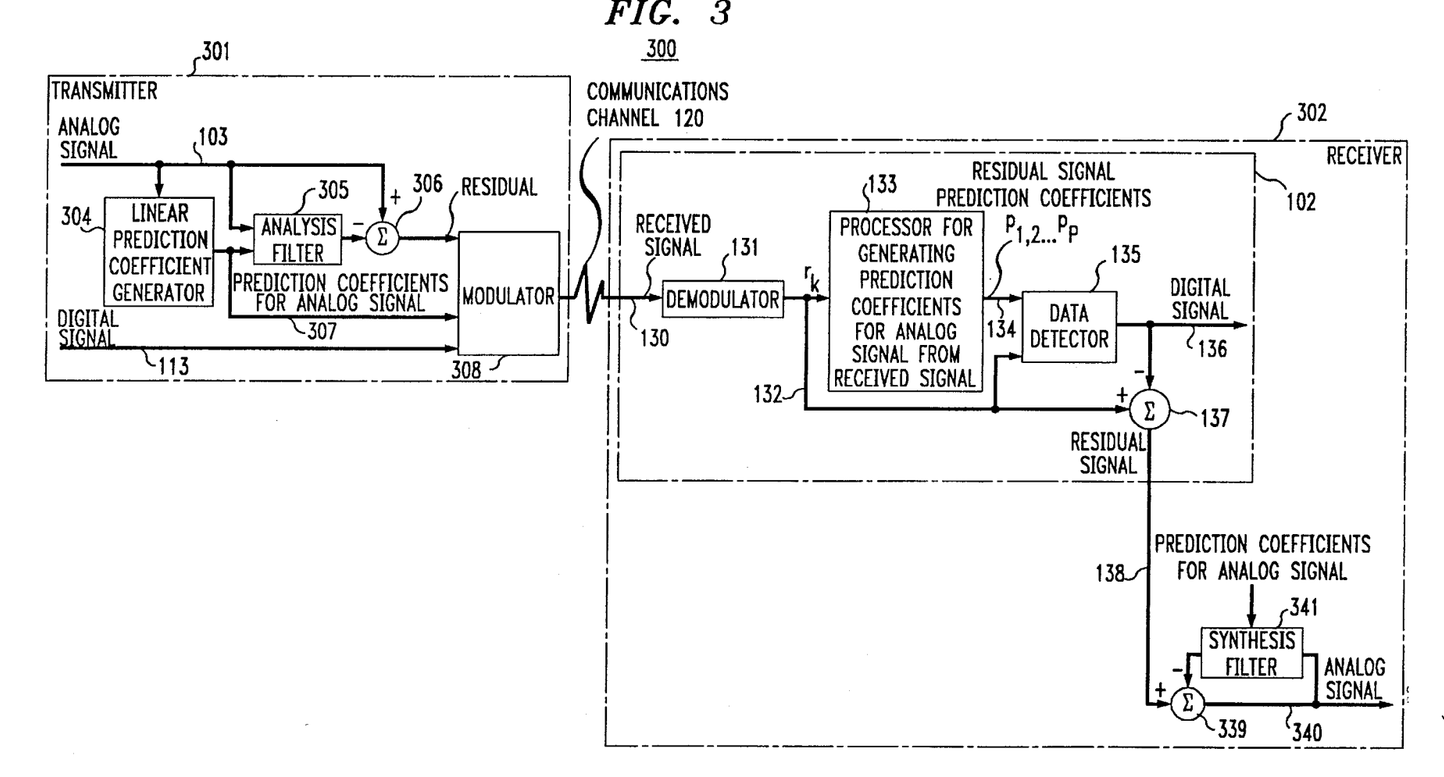
FIG. 3 is a block-schematic diagram of a third embodiment of the present invention wherein the embodiment of FIG. 1 is modified to incorporate linear prediction in the transmitter.

So far we have assumed that the analog signal is transmitted without any processing (other than gain control) at the transmitter and that all the predictive processing is done at the receiver. However, we have found that even better performance is obtained if low-order predictive processing is used at the transmitter so that the transmitted analog signal is a residual signal obtained by subtracting a low-order predicted analog signal from the analog signal. This further improvement is designated as embodiment 300 and is shown in FIG. 3. Referring to FIG. 3, linear prediction coefficient generator 304 within transmitter 301 estimates the prediction coefficients from the analog signal on lead 103, and the analysis filter 305 forms the predicted speech signal. Adder 306 forms the residual signal by subtracting the predicted analog signal from the analog signal on lead 103. The residual analog signal is superimposed upon the digital signal in the modulator 308 and transmitted over the communications channel 120. In addition, the prediction coefficients are transmitted as a part of the digital signal. The reason for using low-order prediction coefficients at the transmitter is that the transmission of prediction coefficients uses a portion of the available bandwidth or data capacity. Typically, $10^{th}$ order prediction can take up as much as 2000 bits/second, while $2^{nd}$ order prediction requires only 500 bits/second of data capacity. After propagating through communications channel 120, the received signal is demodulated by demodulator 131 and the demodulated received signal includes the residual analog signal and the digital signal. Since only low-order prediction is used at the transmitter, the residual signal can be further predicted at the receiver to improve the performance. Processor 133 provides this function. The operations carried out within processor 133 to obtain the prediction coefficients can be those described in reference to FIGS. 7 or 8, with the analog residual signal being used in lieu of the analog signal. Following generation of the digital signal via data detector 135, adder 137 subtracts the digital signal on lead 136 from the received signal to extract the residual analog signal. The analog signal is then synthesized from the residual analog signal using the synthesis filter 341 and adder 339. This synthesized analog signal appears on lead 340. The coefficients of synthesis filter 341 are obtained from the transmitted linear prediction coefficients.

Figure 4:
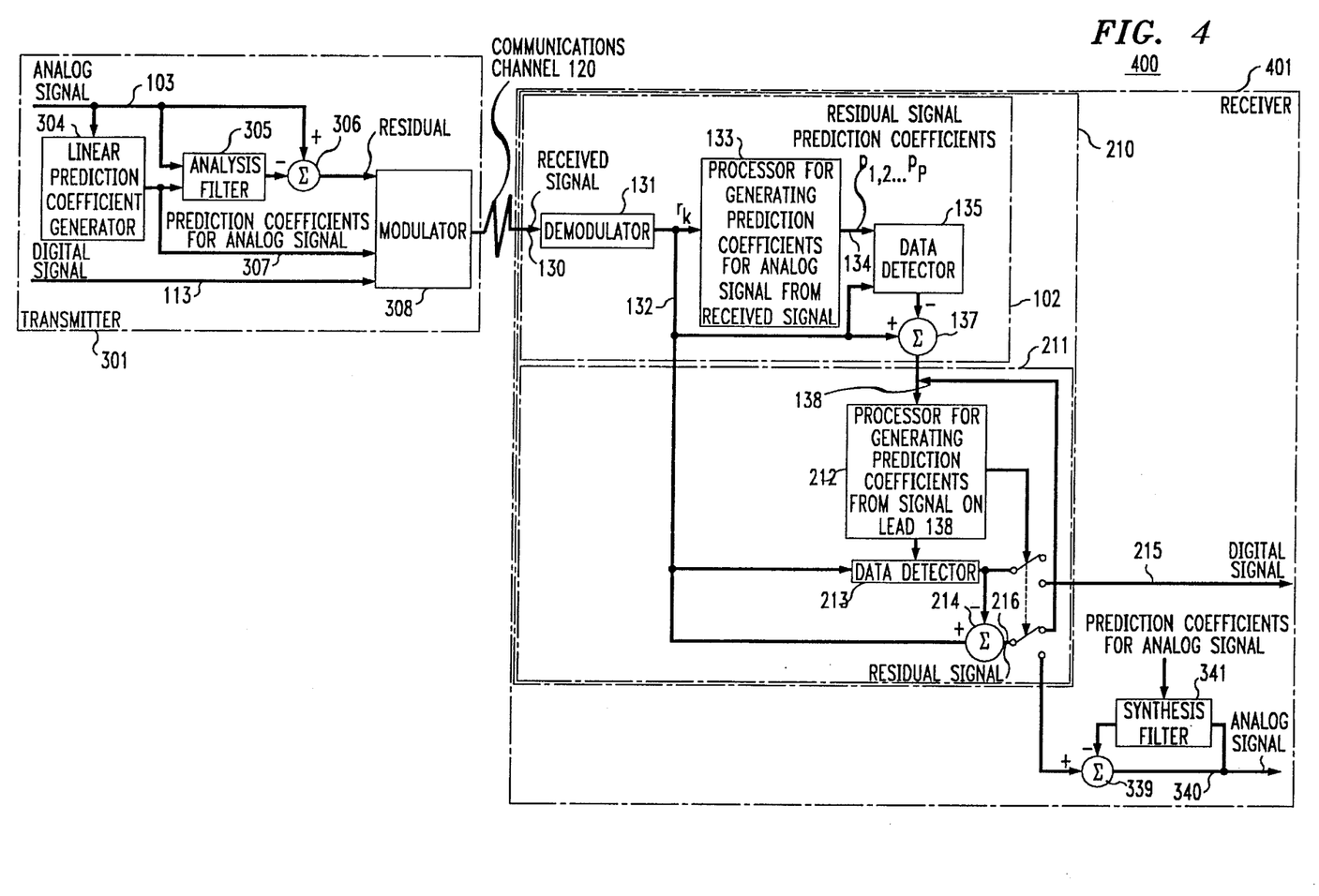
FIG. 4 is a block-schematic diagram of a fourth embodiment of the present invention wherein the embodiment of FIG. 2 is modified to incorporate linear prediction in the transmitter.

It should be noted that in the embodiment of FIG. 3, the transmitter structure has been modified to incorporate low-order prediction, and the receiver structure is that disclosed in FIG. 1, along with the incorporation of synthesis filter 341 and adder 339 to recover the analog signal from the residual signal. The benefits discussed for the embodiment of FIG. 2, along with those for the embodiment of FIG. 3, can be realized by utilization of the transmitter 301 of FIG. 3 with the receiver structure 210 of FIG. 2. This embodiment of the present invention, designated by reference numeral 400, is shown in FIG. 4. The operation of the transmitter in this embodiment has already been described in reference to FIG. 3. Receiver 401 includes receiver 210 whose operation has been described in relation to FIG. 2. The output of receiver 210 in embodiment 400 is the residual signal from which the analog signal can be synthesized in the same manner described in relation to FIG. 3 by using synthesis filter 341 and adder 339.

It should, of course, be noted that while the present invention has been described in reference to illustrative embodiments, other arrangements may be apparent to those of ordinary skill in the art. For example, while the disclosed embodiments utilize discrete devices, these devices can be implemented using one or more appropriately programmed processors, special-purpose integrated circuits, digital processors, or an analog or hybrid counterpart of any of these devices. Or, for example, while in the disclosed embodiments, a pair of analog signal components are formed for the analog signal and a pair of digital component signals are formed for the digital signal, other arrangements are possible. That is, the present invention is also applicable in situations where a single analog signal is superimposed upon a single digital signal. Or, for example, while in the disclosed embodiments, each superimposition of the analog and digital signals modulates the amplitude of quadrature-related carrier signals, the use of such carrier signals can be eliminated by the use of well-known carrierless modulation formats. Indeed, the present invention is applicable for applications in which one or more analog signals are superimposed upon the same number of digital signals with or without the use of carrier signals. Finally, it is recognized that while the disclosed embodiments relate to a received signal which includes analog signal samples and digital signal samples, each analog signal sample being superimposed upon a different digital signal sample, each of the analog signal samples could be quantized prior to being superimposed upon a digital signal sample. Moreover, each quantized analog signal sample could be encoded prior to being superimposed upon a digital signal sample. Therefore, the present invention is not restricted to the superposition of an analog signal upon a digital signal but is also applicable to the superposition of other types of signals, e.g., a digital signal sample superimposed upon another digital signal sample.

What is claimed:

1. Apparatus for use in a communication system wherein a transmitted signal includes at least one superposition of first and second signals, said apparatus comprising means responsive to said superposition of first and second signals for generating prediction coefficients for said first signal independently of any presence of such prediction coefficients in said transmitted signal; and means responsive to said prediction coefficients for recovering said first and second signals from said transmitted signal.

2. The apparatus of claim 1 wherein said recovering means recovers tentative estimates of said first signal.

3. The apparatus of claim 2 wherein said recovering means further includes means for generating prediction coefficients for said tentative estimates of said first signal; and means for generating final estimates of said first signal in response to the prediction coefficients generated from said tentative estimates of said first signal.

4. The apparatus of claim 3 wherein said final estimate generating means generates final estimates of said second signal in response to the prediction coefficients generated from said tentative estimate of said first signal.

5. The apparatus of claim 4 wherein said recovering means for generating final estimates utilizes an iterative process.

6. The apparatus of claim 2 wherein said first signal is a residual signal derived from an input signal and said second signal is a combination of third and fourth signals, said third signal having values representative of prediction coefficients for said input signal and wherein said recovering means generates final estimates of said fourth signal and further includes means jointly responsive to said tentative estimates of said first signal and said third signal for forming final estimates of said input signal.

7. The apparatus of claim 2 wherein said first signal is a residual signal derived from an input signal and said second signal is a combination of third and fourth signals, said third signal having values representative of prediction coefficients for said input signal and wherein said recovering means further includes means responsive to said tentative estimates of said first signal for forming said prediction coefficients for said first signal; and means responsive to the prediction coefficients for said tentative estimates of said first signal for forming final estimates of said input signal and said fourth signal.

8. The apparatus of claim 6 wherein said final estimate forming means forms said final estimate of said input signal in response to said third signal.

9. The apparatus of claim 1 wherein said prediction coefficient generating means processes said transmitted signal as if it solely included said first signal.

10. The apparatus of claim 1 wherein said prediction coefficient generating means includes means for determining the autocorrelation coefficients of said transmitted signal; and means for forming said prediction coefficients from these autocorrelation coefficients.

11. The apparatus of claim 1 wherein said prediction coefficient generating means includes means for determining the autocorrelation coefficients of said first signal; and means for forming said prediction coefficients from these autocorrelation coefficients.

12. The apparatus of claim 11 wherein said determining means determines said autocorrelation coefficients of said first signal by forming the autocorrelation coefficients of said transmitted signal and processing said autocorrelation coefficients said transmitted signal.

13. The apparatus of claim 12 further including means for determining autocorrelation coefficients of said second signal and wherein the processing of the autocorrelation coefficients of said transmitted signal involves subtracting the autocorrelation coefficients of said second signal from the autocorrelation coefficients of said transmitted signal.

14. The apparatus of claim 1 wherein said recovery means forms estimates of said second signal one at a time, each estimate being representative of the value of said second signal at one time and each formed estimate being formed without regard to past or future estimates of said second signal.

15. The apparatus of claim 1 wherein said recovery means forms blocks of second signal estimates, each block including N estimates of said second signal, where N is a predetermined number, and each estimate corresponding to an estimated value of said second signal at a different one of N times.

16. The apparatus of claim 15 wherein said recovery means includes means for forming all possible sequences of N consecutive second signals; and means for selecting one of said sequences using a predetermined criterion.

17. The apparatus of claim 16 wherein said predetermined criterion is a least squares criterion.

18. The apparatus of claim 1 wherein said first signal is an analog signal and said second signal is a digital signal.

19. The apparatus of claim 1 wherein said first and second signals are digital signals.

20. A method for use in a communication system wherein a transmitted signal includes at least one superposition of first and second signals, said method comprising the steps of generating, in response to said superposition of first and second signals, prediction coefficients for said first signal independently of any presence of such prediction coefficients in said transmitted signal; and recovering said first and second signals from said transmitted signal in response to said prediction coefficients.

* * * * *